Figure 1:
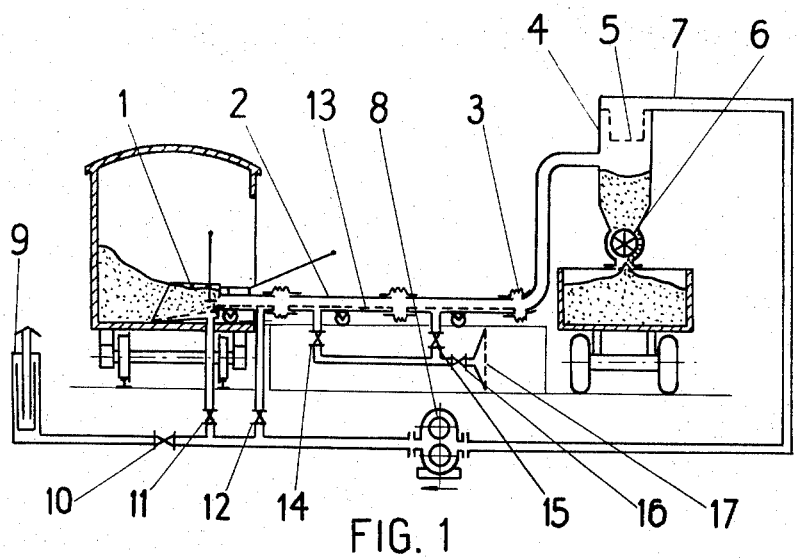

United States Patent
Kalisiak

[11] 3,758,163
[45] Sept. 11, 1973

[54] METHOD OF PNEUMATIC SUCTION CONVEYING OF DISINTEGRATED MATERIALS AND AN ARRANGEMENT FOR APPLICATION OF THIS METHOD

[75] Inventor: Witold Kalisiak, Warsaw, Poland

[73] Assignee: Biuro Konstrukeyjno-Technologiozne Maszyn i Urzadzen Budowlanych, Warszawa, Poland

[22] Filed: Nov. 24, 1969

[21] Appl. No.: 879,425

[30] Foreign Application Priority Data
Nov. 25, 1968 Poland............................ P 130 231

[52] U.S. Cl. .................................. 302/58
[51] Int. Cl. ...................... B65g 53/14, B65g 53/42
[58] Field of Search .................... 302/17, 24, 58, 29

[56] References Cited
UNITED STATES PATENTS

| | | | |
|---|---|---|---|
| 2,527,455 | 10/1950 | Schemm | 302/29 |
| 3,268,264 | 8/1966 | Squires | 302/29 |
| 289,315 | 11/1883 | Smith | 302/58 |
| 469,175 | 2/1892 | Schutte | 302/24 |
| 646,490 | 4/1900 | Deery | 302/58 X |
| 721,743 | 3/1903 | Richmond | 302/27 X |
| 1,184,151 | 5/1916 | Tulley | 302/58 X |
| 2,919,159 | 12/1959 | Lacroix | 302/53 |
| 3,147,041 | 9/1964 | Howcroft | 302/53 |
| 3,307,596 | 3/1967 | Stockel et al. | 302/53 X |
| 2,794,686 | 6/1957 | Anselman et al. | 302/24 |
| 2,301,617 | 11/1942 | Cox et al. | 302/58 |
| 918,795 | 4/1909 | Thurman | 302/58 |
| 287,496 | 10/1883 | Baur | 302/24 |
| 749,206 | 1/1904 | Limbert | 302/24 |

FOREIGN PATENTS OR APPLICATIONS

| | | | |
|---|---|---|---|
| 273,171 | 7/1927 | Great Britain | 302/58 |
| 95,789 | 5/1939 | Sweden | 302/58 |
| 107,973 | 6/1927 | Austria | 302/58 |

Primary Examiner—Evon C. Blunk
Assistant Examiner—W. Scott Carson
Attorney—Irvin A. Lavine

[57] ABSTRACT

A method and apparatus for pneumatic suction conveying in which a suction conduit has connected to it a suction nozzle which fluidizes granular material to be conveyed by forcing gas under superatmospheric pressure through a porous partition forming part of the nozzle. The nozzle is connected to a pneumatic suction conduit including a linearly extending porous partition through which such gas is forced to maintain the material in fluidized state while being conveyed through the conduit.

9 Claims, 5 Drawing Figures

METHOD OF PNEUMATIC SUCTION CONVEYING OF DISINTEGRATED MATERIALS AND AN ARRANGEMENT FOR APPLICATION OF THIS METHOD

The method and apparatus according to the present invention may be used for reloading granular materials from general-purpose means of transport, such as freight cars, trucks and barges, or from dumps, onto other means of transport, or for materials handling.

Known methods of penumatic suction conveying of granular materials, as for instance cement, lime or flour, from the dump to the delivery station consist in using a suction nozzle installed at the inlet end of the conveying pipe and immersed into the dump, a mixture of the granular material with the driving air is made, which mixture then flows through pipelines to separation devices where the materials are separated from the air. The movement of the mixture in the pipeline is forced by suction of the air from the separating devices by means of a vacuum pump that subsequently expels the air into the atmosphere.

The mixture is formed in such a way that the air flowing at high speed from the atmosphere into the suction nozzle immersed in the dump entrains the particles of the material, lying on the surface of the dump, mainly due to the dynamic pressure acting on said particles.

Detaching of the particles from the dump and imparting to them the necessary kinetic energy occurs with an unfavourable force distribution, causing significant losses of energy. Apart from that, the high flow rates of the air being sucked by the suction nozzle cause a mixture of low concentration to be formed, wherefore in such conveyor the energy is mainly consumed in displacing considerable amounts of air, but with only small amounts of materials being handled. The separation of large volumes of air from the materials being conveyed requires large separating devices, especially fine air filters. The high flow rates of the air in the conduits, necessary in order to maintain the particles of the material in motion, cause rapid erosion of the conduit walls, especially at bends of the pipelines.

It is also known to agitate the materials on the dump with rotary disks or other mechanical devices in order to improve the conditions of the entrainment of the material particles with the air entering into the suction nozzle; this, however, does not eliminate the essential disadvantages of known pneumatic suction transport systems, but only to some extent improves the conditions of transport.

The object of the present invention is to eliminate the faults and disadvantages of known methods of pneumatic suction conveying of granular materials. In order to gain these ends there has been developed the present method of taking up materials from the dump or from any transport mean, and providing a new form of flow of said materials in which they are in a fluidized state, with reduced speed of flow.

Another object is to achieve a pronounced reduction of the energy consumption for the conveying, to increase the durability of the conveying facilities and to minimize radically the size of the separating devices.

In accordance with the present invention granular material, before being sucked into the conveying pipe, is subjected to an aeration, which results in its transition into a fluidized state, and owing to a pronounced reduction of the interparticle friction the material achieves the properties of a liquid. In order to maintain the fluidized state of the handled material during transferring of it along the conveying pipe, the material is additionally aerated inside of the conveying pipe. The transferring of the handled material in its fluidized state through the conveying pipe is effected by the difference of pressures at the inlet and at the outlet of the conduit, affected by sucking the air from the separating devices and from the conveying pipes by means of a vacuum pump.

In order to initiate the conveying with full performance, the inlet of the conveying pipe is closed until the full rated vacuum is achieved and until the inlet is entirely immersed in the fluidized material to be conveyed.

The arrangement for application of the method according to the invention involves a suction nozzle, conveying pipes, flexible or rigid, separating devices, a vacuum pump or a fan, air conduits and other auxiliary facilities. The suction nozzle is provided with a porous partition bottom, under which compressed air is introduced, and said porous partition bottom may be made of fabrics or porous plastics, ceramics, metals or sintered metals.

The suction nozzle is further equipped with a throttle valve, preferably shaped as a frustum of a cone, which enables the production of a vacuum in the conveying pipes before the materials being handled are introduced into them, and enables the introduction of the granular materials into the pipes in the fluidized state. The conveying pipes are provided in their lower portions with an air channel with a porous partition bottom. Into this channel air is supplied under superatmospheric pressure that aerates the flowing materials and keeps them in the fluidized state during the transportation along the conveying pipes. In order to prevent any transition of the fluidized material in a rarefied state the amount of the air supplied for the aeration is controlled by means of valves, orofices or nozzles.

Such an organization provides facilities for flowing of the granular materials through the conveying pipes in a fluidized state and at a speed several times lower than that of the air carrying the particles of conveyed materials in known suction conveyors. This, however, does not cause any decrease of the conveying efficiency as the conveyed materials flow through the entire cross section of the pipe, similarly to the flow of fluid being fed owing to the difference of pressures at the inlet and the outlet of the conduit. This results in a several times lower consumption of energy necessary for transferring one ton of conveyed materials a given distance, and moreover results in a pronounced minimizing of the overall dimensions of separating devices, as the results of reduction of filtration surface areas. It is due to the fact that according to the described method several times less carrying air is required to be introduced into the conveying pipes and separating devices than in known suction arrangements of the same efficiency.

Figure 2:
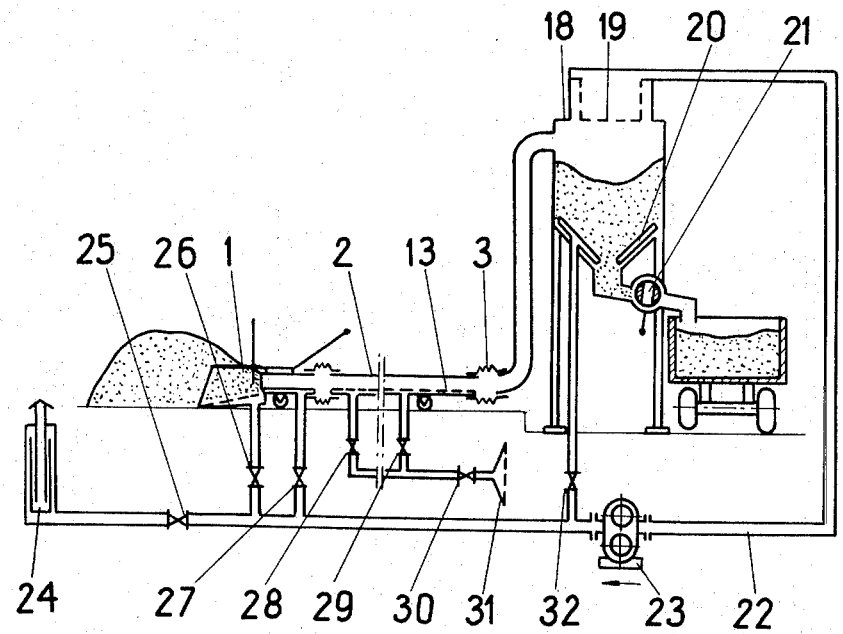
Figure 3:
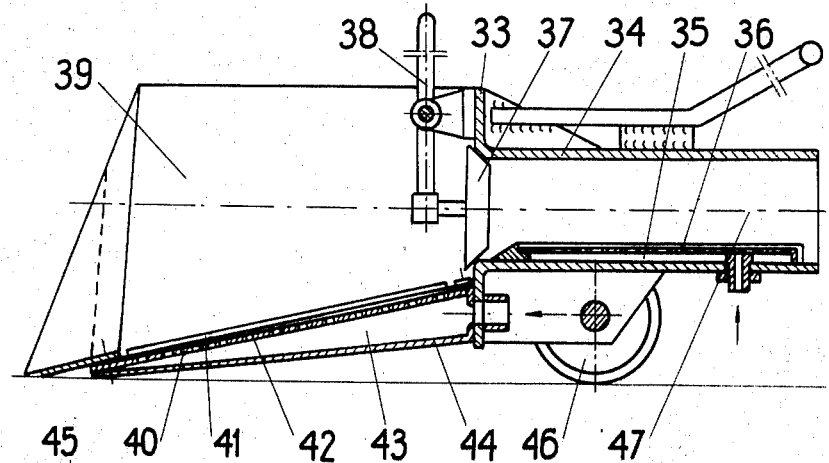
Figure 4:
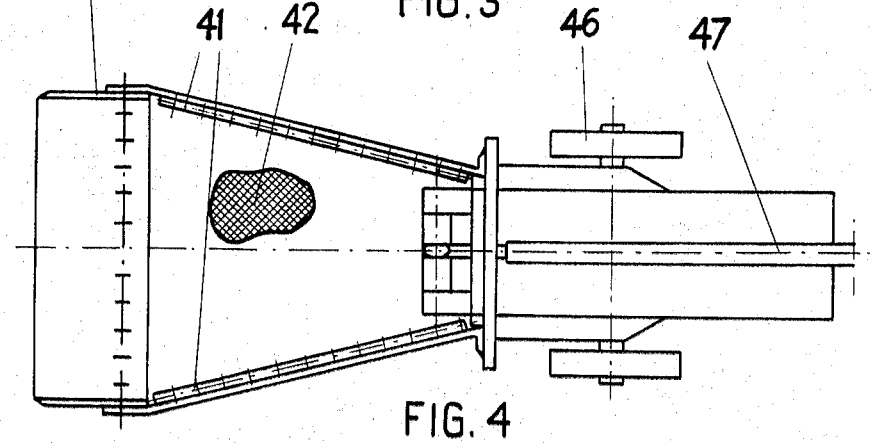
Figure 5:
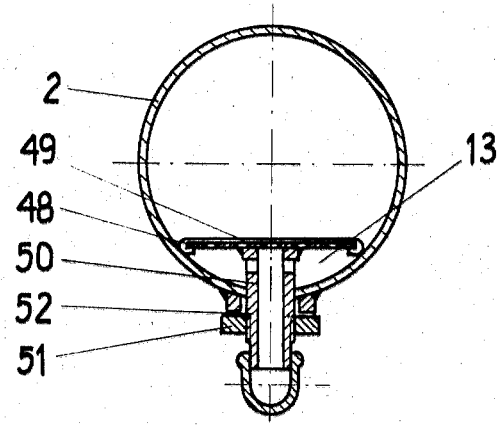

The inventions will be further described on an exemplary application and embodiment of the apparatus with reference to the accompanying drawings, in which: FIG. 1 shows a suction conveyor of continuous operation; FIG. 2 shows a suction conveyor of cyclic operation; FIG. 3 is a longitudinal section of an aerating suction nozzle; FIG. 4 is a top view of said suction nozzle; and FIG. 5 is a cross section of the conveying pipe with additional air supply.

FIG. 1 shows a suction conveyor of continuous operation used for reloading granular materials from general-purpose rail cars onto general-purpose road transport means.

Said conveyor consists of the aerating suction nozzle 1, several rigid sections of the conveying pipe 2 connected to each other with flexible pipe fittings 3 enabling the mutual relative motions of individual pipe sections, the separator 4 with the bag filter 5 and rotary vane feeder 6, conduit 7 for cleaned air, the vacuum pump 8 and the silencer 9.

Between the vacuum pump and the silencer a throttle valve 10 is fitted. In front of the throttle valve there is arranged a branch of the compressed air conduit with the throttle valve 11, leading to the aerating device of the suction nozzle and a conduit branch with the throttle valve 12, leading to the first section of the conveying pipe which is fastened to the suction nozzle. Instead of valves 10, 11 and 12, suitable orifices or throttling nozzles may be installed. To the air conduits 13 provided in the bottom portions of the conveying pipe sections 2 there is connected a separate conduit with throttle valves or orifices or nozzles 14 and 15, and with shut-off valve 16 and the air filter 17. Instead of a series of rigid sections the conveying pipeline may be made as a single section of flexible pipe, also provided with a flexible air conduit with an aerating partition in its bottom portion.

The suction conveyor of cyclic operation (FIG. 2) consists of the aerating suction nozzle 1, several rigid sections of the conveying pipe 2 with air conduits 13, connected to each other by maens of flexible pipe fittings 3 enabling the mutual movements of individual pipe sections, the separator-container 18 with air filter 19, with aerating bottom 20 and discharge valve 21, 22 for the conduit of cleaned air, the vacuum pump 23 and the silencer 24.

Between the vacuum pump 23 and the silencer 24 a throttle valve 25 is fitted. In front of the throttle valve 25 there is arranged a branch of the compressed air conduit with the throttle valve 26, leading to the aerating device of the suction nozzle 1 and a conduit branch with the throttle valve 27, leading to the first section of the conveying pipeline 2 which is fastened to the suction nozzle 1. Instead of valves 25, 26 and 27, suitable orifices or throttling nozzles may be installed. To the air conduits 13 provided in bottom portions of the conveying pipe sections 2 there is connected a separate conduit with throttle valves or orifices or nozzles 28 and 29, and with shut-off valve 30 and air filter 31. To the aerating bottoms 20 of the separator-container 18 the air conduit with shut-off valve 32 is connected. Instead of a series of rigid sections the conveying pipeline may be made as a single section of flexible pipe, also provided in its bottom portion with a flexible air conduit with an aerating partition.

The aerating suction nozzle 1 (FIGS. 3 and 4) includes the shield 33 and a short conveying pipe section 3' fastened to said shield and provided with air conduit 35, and top surface of which forms the the top partition bottom 36. The inlet of the conveying pipe is closed with a throttle valve 37 operated by means of the lever 38. In front of the shield there is arranged the aerating device constructed in the form of a trough open from the front side, and consisting of two side walls 39 made from sheet metal and of the aerating bottom made of perforated plate 40 with double layer 42 of aerating fabric made of synthetic fibres, fixed to the plate with flat irons 41. Beneath the aerating bottom the air chamber 43 is provided having a bottom 44 and side walls 39. To the air chamber 43 an air conduit leads from the vacuum pump as shown in FIGS. 1 and 2.

The aerating device is reinforced at its front end with thicker sheet metal 45 with sharpened front edges. In order to handle the suction nozzle more easily, it is fitted with wheels 46 and a handle 47. Bigger suction nozzles may be provided with their own traversing gear controlled by means of pushbuttons installed on the handle or on a separate control desk. In order to unload the river barges the suction nozzle may be mounted on an outrigger, remotely controlled, and hydraulically, pneumatically or mechanically driven. The sections of the conveying pipeline are made similarly to that of the pipe section 34 belonging to the suction nozzle as shown in FIG. 5. They consist of a steel pipe 2 with the air conduit 13. The top surface 48 of this conduit is perforated and covered with double layer of aerating fabric 49 of synthetic fibres. To the top surface of the conduit there is welded the stub pipe 50 fixed to the conveying pipe by a nut 51. The tightness of the connection is insured by an elastic washer 52. The stub pipe 50 connects the air supply conduit leading from the vacuum pump 8 or 23 or the air filter 17 to said conduit.

The conveyor shown in FIG. 1 operates continuously. After closing the throttle valve 37 shown in FIG. 3, the suction nozzle gets immersed into the body of the materials to be conveyed and the vacuum pump 8 is actuated. The valves 12 and 16 are closed, the valve 11 opened, and the valve 10 closed totally or partially, depending on the technical charactersitics of the conveyor.

The air flowing from the vacuum pump 8 to the aerating partition bottom 42 fluidizes the disintegrated material to be conveyed until a suitable vacuum is achieved in the separator 4. Then, by means of the lever 38 the throttle valve 37 is opened the valves 12 and 16 are opened and the valve 10 is accordingly partially opened. The fluidized granular material is sucked into the conveying pipe 2 and to the separator 4, where it is separated from the air. Maintaining of the fluidization state of the material is to be conveyed in the pipe is achieved by means of sucking additional air from the ambient atmosphere through the air filter 17 and streaming this air through the aerating partitions arranged in the bottom portion of the conveying pipeline.

In course of running the conveyor the suction nozzle should be operated by means of the handle 47 in such a way that the aerating arrangement of the suction nozzle is maintained filled with the conveyed material. The air cleaned by the air filter 5 is sucked through the conduit 7 to the vacuum pump 8 and by means of this pump is partially discharged to atmospheric through the silencer 9 and the aerating arrangement of the suction nozzle, and partially forced in the conveying pipe through the aerating partition bottom 36.

The distribution of streams of the forced air is accomplished by control of the valves 10, 11 and 12, or by fitting suitable orifices or damping nozzles in the conduits leading from the vacuum pump to the silencer, the aerating arrangement of the suction nozzle and the first section of the conveying pipe. The handled material, separated in the separator 4, is continuously discharged from said separator by means of the rotary vane feeder 6, wherefrom it dumps into a road transport vehicle or other receiver.

The conveyor shown in FIG. 2 operates in a cyclic mode. Actuating the conveyor is accomplished in a similar way to that of the conveyor of FIG. 1, with valves 27 and 30 being closed, valve 25 partially closed, and valve 26 open. There is also closed the additional valve 32 in the conduit leading to the aerating arrangement 20 located in the bottom portion of the separator-container 18.

Once there exists in the container-separator 18 a suitable vacuum, the throttle valve 37 is opened by means of the lever 38, the valves 27 and 30 are opened and the valve 25 is partially opened. The conveyed granular material in fluidized state is sucked into the conveying pipe and further to the separator-container 18 where is separated from the air. During the conveying, the discharge valve 21 is closed. After the separator-container 18 is filled with the handled materials - what is indicated by means of a suitable level gauge - and after an appropriate transport means or other receiver is in place under the discharging valve 21, the valves 25, 26, 27 and 30, and the throttle valve 37 are closed, and the valve 32 in the circuit leading to the aerating arrangement 20 is opened. Upon opening the discharging valve 21 the granular materials fluidized by means of aerating arrangements 20 and stored in the separator-container pass through said valve into the receiver beneath it. After the separator-container 18 is completely discharged, the suction conveying apparatus between the suction nozzle 1 and the separator-container 18 is again put in operation. The separator-container may be shaped as a cylindrical bin with its axis vertical, and with its bottom slightly inclined to the horizontal plane, or with a conical bottom in which case it may not have an aerating devices, or it may have the form of a cylinder with its axis inclined to the horizontal plane under an angle of a few up to a dozen or so degrees.

As can be seen from the described examples herein, the suction conveyor is mainly intended for the reloading of granular materials from general-purpose transport means waggons, trucks, barges or dumps onto other means of transportation or general-purpose storage. It also may be used as handling equipment for shorter transport distances.

The aerating suction nozzle may also be used for suction conveyors for transferring disintegrated materials in a rarefied state for longer distances. In this case it also causes the reduction of the energy consumption for conveying, owing to producing a mixture of the materials being handled with air, through transition of said materials from non-fluidized, to being over fluidized in a rarefied state.

The invention is not limited to the exemplary embodiments - or combinations of them - particularly described and shown in the accompanying drawings nor to all its features taken together but includes also the application of individual features and modifications of the embodiments disclosed hereinabove within the fundamental concept of the invention.

What is claimed is:

1. A method of pneumatic suction conveying granular material comprising:

fluidizing granular material in an upwardly open nozzle having a partition in the bottom thereof, said partition being of a substance having a porous gas permeable characteristic, by introducing gas upwardly into said material through said partition in the nozzle, applying suction to a conduit having a valved inlet end adjacent said nozzle with valve closed, opening the valve thereby introducing the fluidized granular material into the conduit and pneumatically conveying the material through the conduit by maintaining the suction in said conduit, and maintaining the material in the conduit in the fluidized state by introducing additional gas upwardly into said material through a porous partition, while it is being conveyed through said conduit.

2. The method of claim 1, and further including starting said conveying by initially closing the inlet end of the conduit, then entirely immersing said inlet in the fluidized material, whereby to prevent the introduction of air which is free of said granular material into said conduit.

3. Pneumatic conveying apparatus comprising:

a conduit having therein means for maintaining in fluidized state granular material therein comprising linearly extending gas permeable porous partition means adjacent the bottom thereof and along substantially the entire length thereof, suction means connected to said conduit, a suction nozzle at the inlet end of said conduit including means for fluidizing a body of granular material, said means comprising a partition defining a lower surface of said nozzle, said partition being of a substance having a porous gas permeable characteristic, said nozzle being upwardly open, valve means between said suction nozzle and the inlet of said conduit, and means for supplying gas under superatmospheric pressure beneath said porous partition in said suction nozzle and to a space in said conduit bounded by said porous partition means to thereby fluidize granular material in said suction nozzle and to maintain said material in the fluidized state while it is being conveyed through said conduit.

4. The apparatus of claim 3, said suction means comprising a pump, said space beneath said porous partition of said suction nozzle being connected to the outlet of said pump by pipe means.

5. The apparatus of claim 4, said space in said conduit bounded by said porous partition means connected to said outlet of said pump by pipe means.

6. The apparatus of claim 3, said suction means comprising a pump, said space beneath said porous partition of said suction nozzle being connected to the outlet of said pump by pipe means.

7. The apparatus of claim 3, said valve means comprising a conical valve.

8. The apparatus of claim 3, said conduit comprising a plurality of rigid sections, and flexible fluid conducting means joining said sections.

9. The apparatus of claim 3, said conduit comprising at least one flexible section.

* * * * *